Patented Aug. 29, 1950

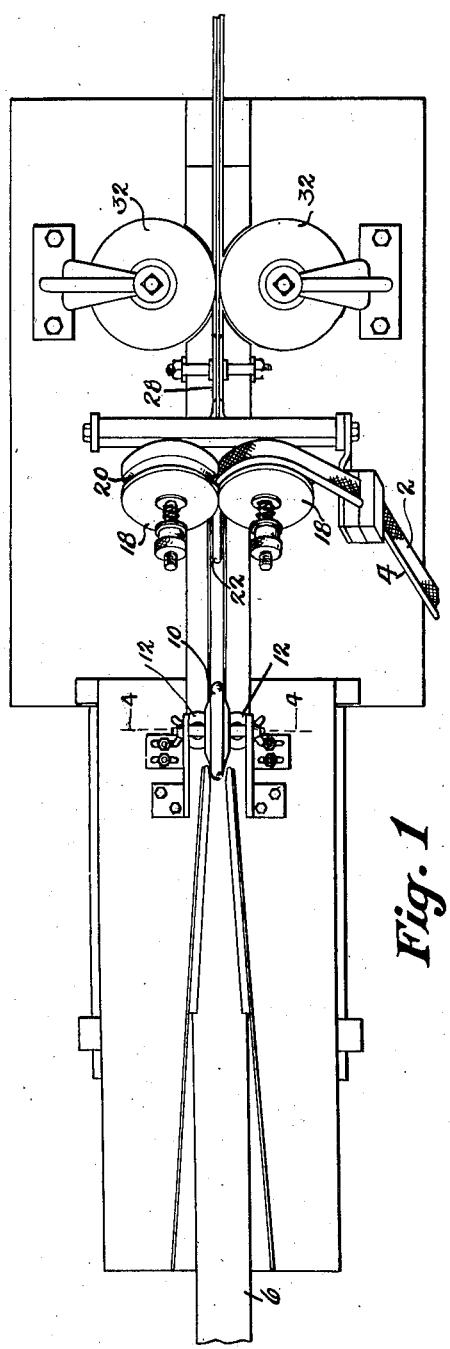

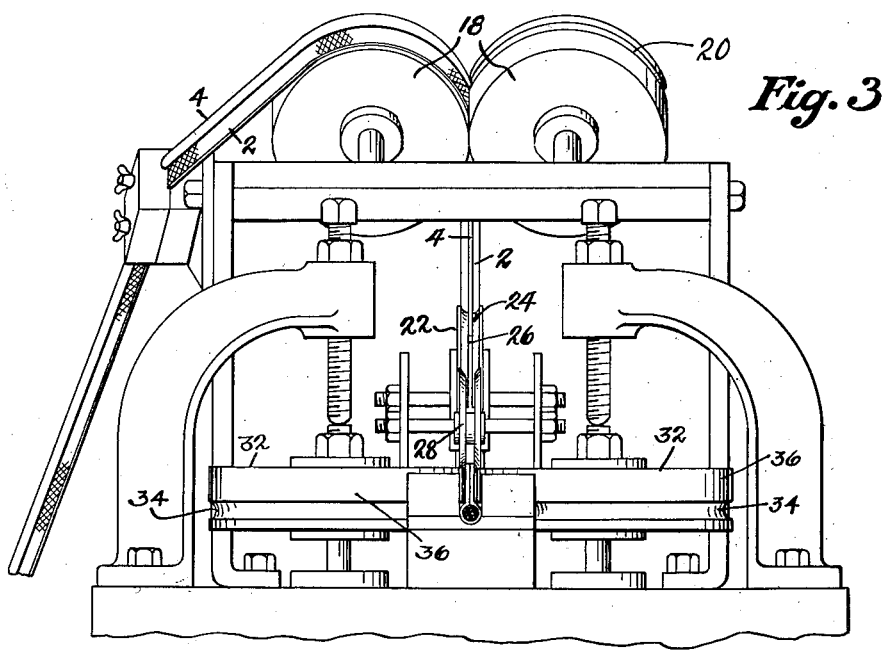
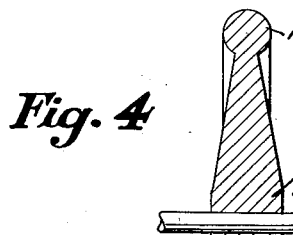
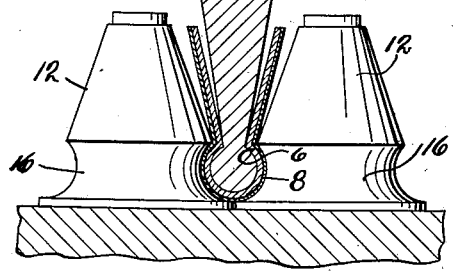
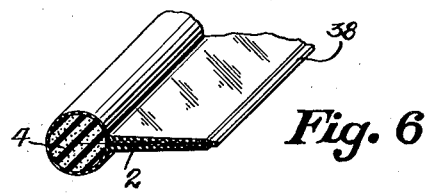

2,520,113

UNITED STATES PATENT OFFICE 2,520,113

METHOD OF COVERING WEATHER STRIPPING COMPOSED OF A WEB HAVING A CONTINUOUS BEAD EXTENDING ALONG AND BONDED TO ONE EDGE THEREOF

Grover W. Brown, Wyckoff, and Victor E. Metz, Rutherford, N. J., assignors to The Okonite Company, Passaic, N. J., a corporation of New Jersey Application June 27, 1946, Serial No. 679,732

3 Claims. (Cl. 154—120)

Our invention relates to a method of applying a layer of rubber or rubber-like material to weatherstripping as a protective covering.

The weatherstripping to be covered is made in several steps. The first step is to weave a cloth web containing steel wire. The next step involves the extrusion and continuous cure of a round cylinder of sponge rubber or a rubber-like material along one edge of the cloth web so that the same is embedded in this cylindrical member. The cylindrical member or bead and the web are bonded to each other.

The next step is the application of an outer protective covering to this assembly, this covering being of rubber or rubber-like material. It is this step with which the present invention is concerned primarily.

Where the outer protective covering is in the nature of a film as distinguished from a cover of substantial thickness, it may be applied by the latex dip process. Where this protective covering is very heavy, say one eighth inch in thickness, then it may be applied by extrusion.

Where the covering is to be intermediate these two thicknesses difficulty is encountered, this difficulty being overcome by the method of the present invention.

Generally speaking, our invention provides a method wherein a metal-backed tape-like strip of the unvulcanized covering material is folded about the weatherstripping including the webbing, the edges of the covering material being brought together at the outer edge of the webbing.

The assembly is then vulcanized, and the metal backing removed leaving the weatherstripping completely covered with a vulcanized material.

In the accompanying drawings we have illustrated a machine for the practice of our invention.

Fig. 1 is a plan view of the machine.
Fig. 2 is a side elevational view of the machine of Fig. 1;
Fig. 3 is an end view of the machine of Fig. 1;
Fig. 4 is a section on the line 4—4 of Fig. 1;
Fig. 5 is a fragmentary isometric view of the weatherstripping to be covered; and
Fig. 6 is a fragmentary isometric view of the finished product.

As above explained, the weatherstripping is first made up in the form shown in Fig. 5 of the drawings. A web of cloth 2 is first prepared, fine steel wire being woven into this fabric. A cylindrical bead 4 is then extruded about one edge of the web and vulcanized to bond the two together. This is conventional practice, and the covering material is to be applied to this assembly so as completely to cover the same.

In accordance with our invention we prepare a tape 6 of rubber or rubber-like material which is to constitute the covering material, and back this tape with tin 8. This covering material at this stage is unvulcanized.

The tin backed covering tape is fed between a forming roller 10 and a pair of conical side forming rollers 12. The periphery of the forming roller 10 is provided with a bead 14, and the side forming rollers 12 are provided with peripheral grooves 16 complementary to the bead 14, so that as the tin backed covering tape passes between the roller 10 and the side forming rollers it will be bent to the shape of the bead 4 of the weatherstripping. The side rollers 12 press the tin-backed covering tape against the inside roller 10 at the lowest point of revolution of roller 10, so that as the covering tape is dragged forward the inside forming roller 10 spreads the covering tape slightly as seen in Fig. 4. This facilitates forcing of the weatherstripping into place as will be brought out presently.

The weatherstripping to be covered is fed in from the side of the machine between a pair of rollers 18 having a peripheral groove 20 for the reception of the bead 4 of the weatherstripping. The weatherstripping passes downwardly about a roller 22 which is disposed in the path of the covering tape, the axis of this roller being transverse of the direction of travel of the tape. This roller is provided with a peripheral slot 26 for the reception of the webbing 2 of the weatherstripping.

The periphery of roller 22, it will be appreciated, will force the weatherstripping downwardly between the two sides of the covering tape the bead 4 bottoming on the covering tape. The covering tape and the weatherstripping then pass beneath and in contact with the periphery of roller 28. This roller has a grooved periphery, and a peripheral slot which partially closes the sides of the covering strip upon the webbing 2, the final forming of the covering tape being accomplished by a pair of rollers 32 rotatable about axes disposed transverse to the tape and weather stripping and at 90° to the axes of rollers 22 and 28. These rollers 32 have a peripheral groove 34 and flat surface 36, by which the covering material is squeezed into intimate contact with the weatherstripping, these rollers also pinching the opposed sides of the covering material together just beyond the edge of the web 2 as shown at 38 in Fig. 6, so that the weatherstripping is completely covered from end to end.

The assembly is finally vulcanized by any conventional method and the tin backing removed.

It will be seen from all of the foregoing that we have provided a method of covering weatherstripping whereby the same is completely covered, the method being adapted for covering the weatherstripping in continuous lengths.

It will be seen from the drawings that the rollers 10, 12, 18, 22 and 28 are all adjustably mounted so that the machine is adapted to handle stripping of different sizes if desired.

It is to be understood that changes may be made in details of construction and arrangement of parts within the purview of our invention.

What we claim is:

1. The method of covering weatherstripping composed of a web and a bead extending along one edge of the web and bonded thereto, said method comprising pre-forming a metal-backed tape of vulcanizable rubber-like material into the general contour of the weatherstripping, inserting the weatherstripping into the pre-formed tape with the metal backing of the tape facing outwardly, applying pressure to the exterior of the preformed tape until the material of the tape intimately contacts the surface of the bead and web of the weatherstripping, subjecting the assembly to vulcanization, and then removing the metal backing.

2. The method of covering weatherstripping composed of a web and a bead extending along one edge of the web and bonded thereto, said method comprising pre-forming a metal-backed tape of rubber-like material into the general contour of the weatherstripping, continuously advancing the pre-formed tape and continuously inserting the weatherstripping thereinto with the metal backing facing outwardly, applying pressure to the exterior of the pre-formed tape until the tape contacts the entire surface of the weatherstripping and the edge portions of the tape are brought into contact with each other beyond the outer edge of the web of the weatherstripping, vulcanizing the tape and then removing the metal backing.

3. The method of covering weatherstripping composed of a web and a bead extending along one edge of the web and bonded thereto, said method comprising continuously advancing a metal-backed tape of rubber-like material, while pre-forming the tape into the general contour of the weatherstripping, continuously inserting the weatherstripping thereinto with the metal backing facing outwardly, applying side pressure to the tape to cause the tape intimately to contact the weatherstripping web and to bring the edges of the tape into contact with each other beyond the outer edge of the weatherstripping web, vulcanizing the tape and then removing the metal backing.

GROVER W. BROWN.
VICTOR E. METZ.

REFERENCES CITED

The following references are of record in the file of this patent:

UNITED STATES PATENTS

| Number | Name | Date |
| --- | --- | --- |
| 1,602,635 | Baldwin et al. | Oct. 12, 1926 |
| 1,622,340 | Paeplow | Mar. 29, 1927 |
| 1,695,622 | Wachsmuth | Dec. 18, 1928 |
| 1,954,343 | August | Apr. 10, 1934 |
| 2,195,046 | Best | Mar. 26, 1940 |

FOREIGN PATENTS

| Number | Country | Date |
| --- | --- | --- |
| 538,749 | Great Britain | Aug. 14, 1941 |